United States Patent [19]

Chung

[11] Patent Number: 4,869,586

[45] Date of Patent: Sep. 26, 1989

[54] SUNGLASSES IN COMBINATION WITH CAP VISOR

[76] Inventor: Liu C. Chung, 2, Lane 46 Chang Sho Street San Chung, Taipei Hsien, Taiwan

[21] Appl. No.: 157,288

[22] Filed: Feb. 17, 1988

[51] Int. Cl.⁴ ............................ G02C 5/14; G02C 3/02
[52] U.S. Cl. .................................... 351/158; 351/112; 351/155; 2/10
[58] Field of Search ................ 351/41, 112, 158, 155; 2/10

[56] References Cited

U.S. PATENT DOCUMENTS 4,179,753 12/1979 Aronberg et al. .............. 351/155 X

FOREIGN PATENT DOCUMENTS 023031 11/1900 Switzerland ........................ 351/155

Primary Examiner—Rodney B. Bovernick
Attorney, Agent, or Firm—Staas & Halsey

[57] ABSTRACT

Sunglasses incorporated with a cap visor or a band, and provided with an adjuster to regulate the sunglasses' upper and downward movements at different angles.

3 Claims, 5 Drawing Sheets

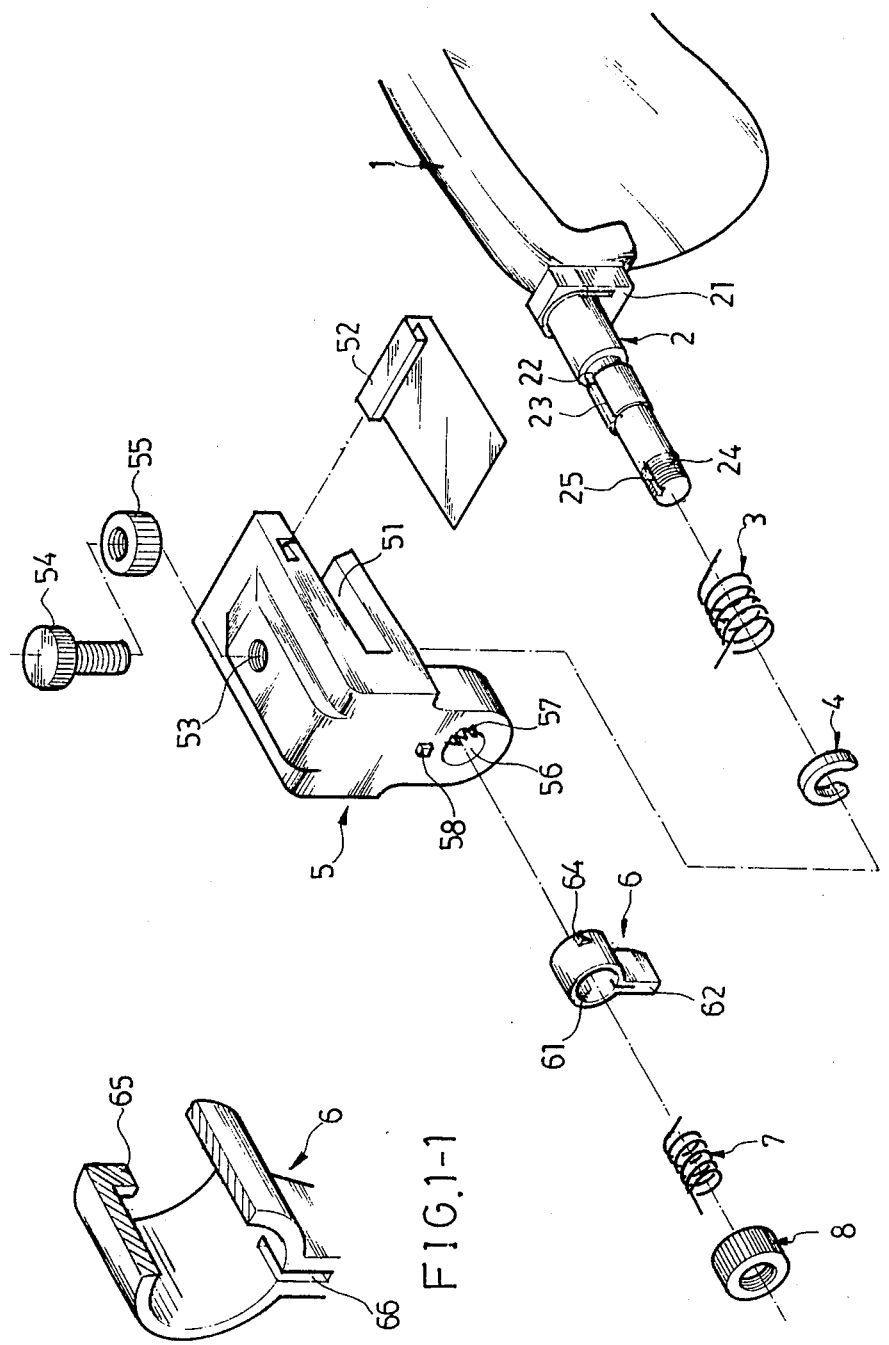
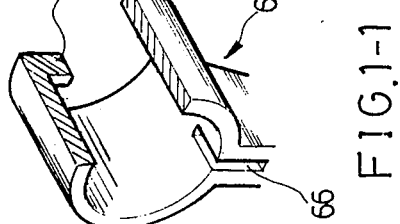

SUNGLASSES IN COMBINATION WITH CAP VISOR

BACKGROUND OF THE INVENTION

With conventional sunglasses, two spectacle frame supports are worn at the ears. The spectacle frame is supported by the wearer's nose ridge. The wearer's spectacles may slide down due, e.g. to sweating after they are worn for long time. In this regard, the wearer of the spectacles may feel uncomfortable due to this defect. Besides, when the sunglasses are not in use, they must be folded, often with trouble. If they are damaged, the sunglasses are not easily repaired back to the normal condition.

The front edge of sunglasses or goggles is flat and horizontal, which can not effectively shield eyes from the sunlight, Ordinary goggles are made up of plastic material and are fixed in form. They do not accommodate different types of wearers' faces. Thus, there are many defects in conventional sunglasses and goggles.

SUMMARY OF THE INVENTION

The present invention overcomes the above-described common defects of sunglasses and goggles. Its main feature is to assemble the sunglasses and a visor cap together into an incorporated body. The sunglasses are suspended at the underside of the cap visor, do not touch the wearer's ears and nose ridge, and can be easily worn snugly.

Another feature of the present invention is a device installed on the sunglasses in the form of an adjuster. By merely pulling the adjuster lightly, the sunglasses spring upward to the underside of the cap visor.

Another feature of the present invention is the combination of sunglasses with a new device using fabric to bind the glasses to the wearer's head with the function of sweat absorption. With the pull of the adjuster, the position of the sunglasses can be adjusted to spring upward or back to the front of the eyes.

Another feature is the enhanced suitability and convenience for wearing by the user during recreational activity, particularly, mountaineering, camping or snow skiing.

A further feature is that, a projecting portion at the front edge of the sunglasses can serve to shield the wearer's eyes from the sunlight.

BRIEF DESCRIPTION OF THE DRAWINGS

FIG. 1 is an exploded diagram of the adjuster of the present invention.

FIGS. 1—1 is the cross sectional view of a part of the adjuster of the present invention.

DETAILED DESCRIPTION OF THE PREFERRED EMBODIMENTS

Figure 2:
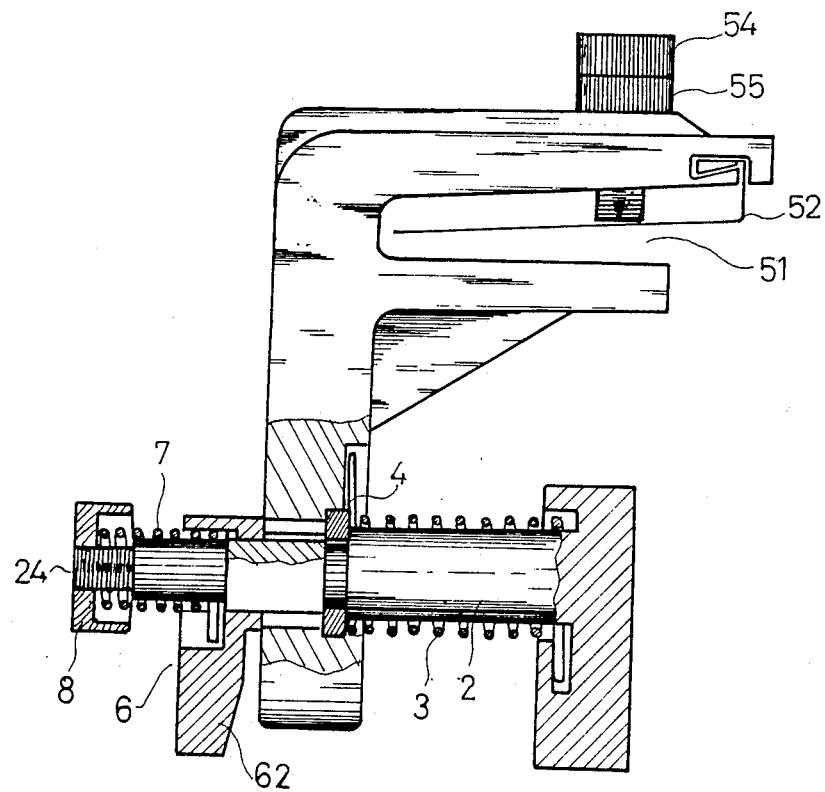
FIG. 2 is a side, partial cross sectional view of the present invention.

FIG. 1 is a diagram of the adjuster in the present invention, in which the two sides of the spectacle frame 1 are installed with a fixation shaft 2, respectively. The fixed end of each fixation shaft 2 is equipped with a concave slot 21 for receiving the end of spring 3 which is squeezed within the concave slot 21. The center of the fixation shaft 2 is also equipped with an opening slot 22 to receive a squeezing ring 4 which is fitted within the opening slot 22. Adjacent the opening slot 22 is a long slot 23. The surface of the free end of the fixation shaft 2 is provided with concentrated threads 24 and a concave slot 25.

An opening slot 51 is made within a fixer 5 to receive a check sheet 52 to be squeezed in the slot 51. The upper side of the fixer 5 is provided with a round hole 53 in which a screw 54 locks a nut 55. The screw 54 penetrates the round hole 53 for locking the fixation check sheet 52. At the bottom area of the fixer 5, there is a round hole 56 for receiving the fixation shaft 2. The hole 56 is provided with a squeezing block 57 which has three projecting teeth. Above the squeezing block 57, there is a square convex block 58.

As seen in FIGS. 1 and 1—1, at the center of an adjuster 6, there is a round hole 61 to receive the fixation shaft 2. At its underside of the adjuster 6 there is a long block 62. At the side of the adjuster 6, there is a triangular block 64 projecting outside. At the inside of the adjuster 6, there is a squeezing block 65 which is squeezed within the long slot 23. Another long slot 66 is to facilitate one end of a spring 7 to be fitted in the slot 66. The spring 7 encases the fixation shaft 2 at its free end in coordination with nut 8 and the threads 24 to fix the spring 7 in position.

Reference will now be made to refer to the attached FIG. 2, a cross sectional view of the adjuster 6 when it has been assembled. The fixation shaft 2 penetrates the round hole 56 of the fixer 5. The spring 3 surrounds the fixation shaft 2. One end of the spring 3 is squeezed in the concave slot 21, and the squeezing ring 4 is fitted into the opening slot 22 to fix the position of the spring 3. The adjuster 6 also encases the fixation shaft 2. The squeezing block 65 at its inside is also squeezed in the long slot 23. The projecting triangular block 64 is fitted into the squeezing block 57 which has the three projecting teeth and also it can be fitted at the square convex block 58 which in coordination with the spring 7 encases the fixation shaft 2. The nut 8 has threads inside to couple and fix the spring 7.

Figure 3:
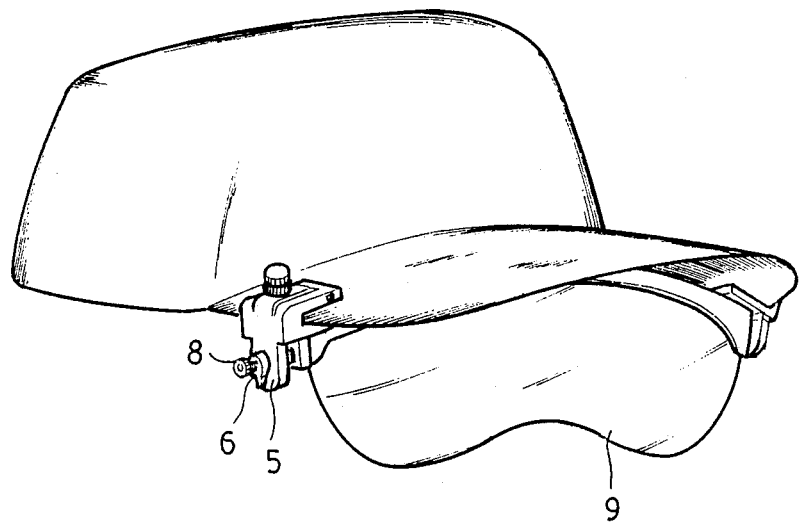
FIG. 3 is a perspective view of one embodiment of the sunglasses used with a cap visor, according to the present invention, with the sunglasses down.

Reference will now be made to FIG. 3, when the user wants to use the sunglasses 9, the fixer 5 must be fixed in hat visor sides, then the adjuster 6 is turned clockwise and the fixation shaft 2 and spectacle frame 1 are moved downward because the squeezing block 65 is fitted and squeezed within the long slot 23. The triangular block 64 on the adjuster 6 is fitted with the projecting squeezing block 57 in order to fix the sunglasses 9 in the vertical position for use.

Figure 4:
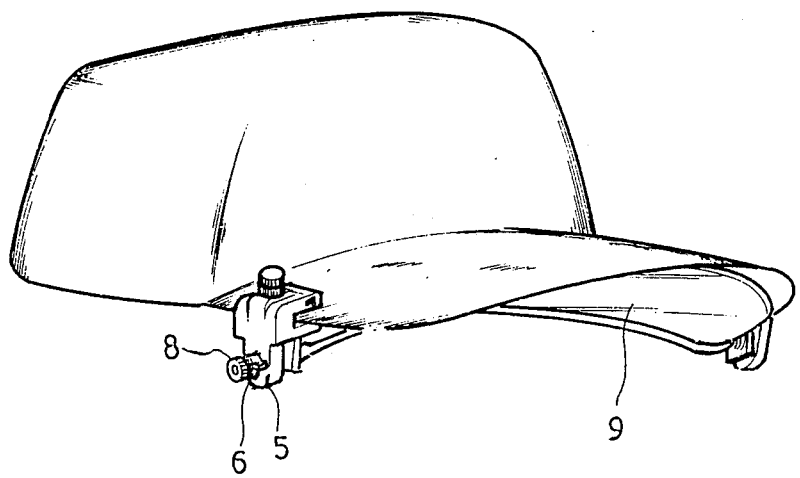
FIG. 4 is a perspective view of the sunglasses shown in FIG. 4, but in the up position.

As shown in the attached FIG. 4, when the sunglasses 9 are not used, the wearer may lightly pull the adjuster 6 outwardly to make the outside triangular block 64 leave the squeezing block 57 and also the squeezing block 65 leaves the long slot 23. The adjuster 6 is sprung and turns as a result of the spring 7. By means of recoil strength of the spring 3, the fixation shaft 2 and spectacle frame 1 turn. The sunglasses 9 thus spring upward and lie flatly in a stored position under the hat visor. If the wearer wants to use the sunglasses again, he may turn the adjuster 6. The operation is simple and convenient.

Figure 5:
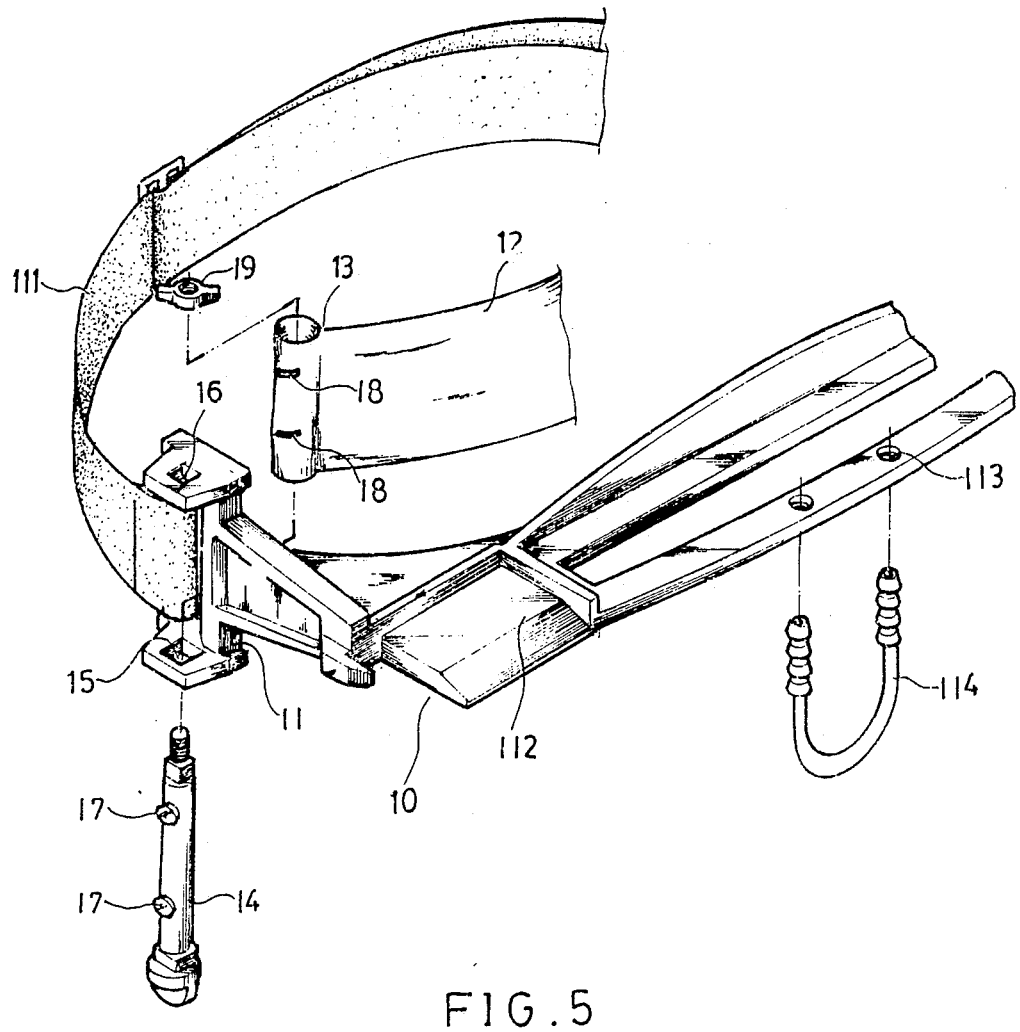
FIG. 5 is a perspective view of visorless sunglasses according to an alternate embodiment of the present invention.

Reference will now be made to FIG. 5 in which, instead of the visor connection embodiment of the sunglasses, the embodiment is a hatless type of sunglasses. The two sides of a fixer 10 are installed with a long support 11. The inside of the support 11 inches an inner slot (not shown in the drawing) to receive the round column 13 at a fabric band 12 front end to be squeezed into the inner slot in coordination with a branch shaft 14 to be received by the fixer 10 at round hole 15, 16. The projecting blocks 17 of the branch shaft 14 penetrates the opening slots 18 in the fabric band 12. The threaded nut 19 fixed at the top end of the shaft 14.

At the rear of the fixer 10, there is a connected elastic band 111 which may be used at the back of the head to adjust tightness or looseness. At the front of the fixer 10, there are two holes 113. A "U" shape rubber check rod 114 is fixed in the holes 113 to serve as recoiling protection of the sunglasses 9 so that the sunglasses will not be damaged easily.

Figure 6:
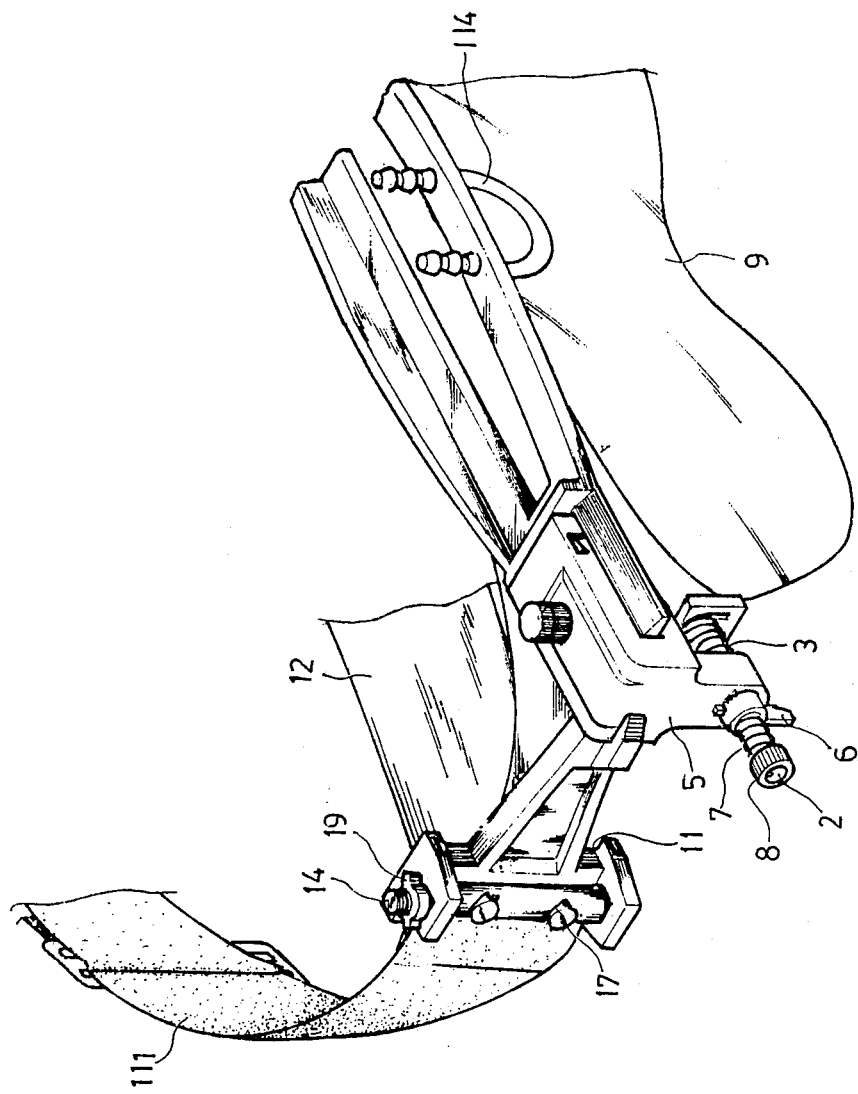
FIG. 6 is the view of the practical example when the visorless sunglasses in the present invention after the completion of their assembly.

Reference will now be made to FIG. 6 showing a practical example of the capless sunglasses. At first, the oblique plate 112 at the side of the fixer 10 is inserted into the opening slot 51 of the fixer 5 to be fixed by the screw 54. The fabric band 12 is used against the forehead of the wearer and the elastic band 111 is worn on the back of his head. The adjustment of the sunglasses 9 of this embodiment is the same as the cap connection embodiment described above. If the wearer wants to adjust the tightness of the fabric band 12 he may turn on the nut 19 and he may also turn the fabric band to achieve adjustment thereof.

I claim:

1. Glasses, comprising:
    (a) a spectacle frame;
    (b) a shaft connected to the frame and including
        (i) at a fixed end, a first slot for receiving a first spring,
        (ii) at approximately the center, a second slot for receiving a ring, and a third slot adjacent the second slot, and
        (iii) at a free end, threading and a fourth slot;
    (c) a fixing member, including
        (i) a first opening for receiving a squeezing member,
        (ii) a first hole for receiving means for adjusting the squeezing member,
        (iii) a second hole having projections, and
        (iv) a first block;
    (d) an adjuster including
        (i) a third hole formed therein,
        (ii) a second block extending therefrom, the second block including a fifth slot for receiving a second spring,
        (iii) a third block extending inwardly of the adjuster, and
        (iv) a fourth block extending outwardly of the adjuster; and
    (e) a nut corresponding to the threaded free end of the shaft,
    wherein, the shaft receives the first spring, the ring, the fixing member, the adjuster, the second spring and the nut such that the frame can be moved between a first substantially vertical position and a second, substantially horizontal position by moving the spring-biased adjuster relative to the fixing means and cooperating with one of the first block and projections.

2. The sunglasses as recited in claim 1, wherein the fixing means is attached to a cap visor.

3. The sunglasses as recited in claim 1, wherein the fixing means is attached to a head band device, including
    (a) a support rack which receives the fixing means, said support rack having
        (i) a means for receiving a fabric band, and
        (ii) shaft means for adjustably receiving an elastic band.

* * * * *